United States Patent [19]

Spiers et al.

[11] Patent Number: 4,666,550
[45] Date of Patent: May 19, 1987

[54] APPARATUS FOR PRODUCING A STRIP OF LAMINATED SHEET MATERIAL

[75] Inventors: Steven F. Spiers; Harold T. Hinson; William H. Smick, III; Gregory A. Shelton, all of Richmond; Everett C. Grollimund, Midlothian, all of Va.

[73] Assignee: Philip Morris Incorporated, New York, N.Y.

[21] Appl. No.: 832,237

[22] Filed: Feb. 24, 1986

[51] Int. Cl.⁴ .............................................. B32B 31/00
[52] U.S. Cl. .................... 156/361; 118/221; 118/260; 156/259; 156/265; 156/554; 226/44; 226/197
[58] Field of Search .......................... 156/259, 264–265, 156/271, 554, 561; 226/197, 44, 45; 118/260, 221

[56] References Cited

U.S. PATENT DOCUMENTS

| 2,339,891 | 1/1944 | Tarnuzzer | 118/212 X |
| 3,307,995 | 3/1967 | Martin | 156/264 X |
| 3,326,436 | 6/1967 | Huck | 226/44 X |
| 3,954,213 | 5/1976 | Andersen | 226/197 X |
| 4,011,976 | 3/1977 | Greer | 226/44 X |
| 4,163,684 | 8/1979 | Kartanson | 156/519 X |
| 4,176,775 | 12/1979 | Brendemuehl | 226/197 X |
| 4,572,752 | 2/1986 | Jensen et al. | 156/361 X |
| 4,595,441 | 6/1986 | Holvoet et al. | 156/265 |

Primary Examiner—David Simmons
Attorney, Agent, or Firm—Jeffrey H. Ingerman

[57] ABSTRACT

Apparatus is provided for laminating a strip of foil to each edge of a double-width strip of cigarette tipping paper. A double-width strip of foil having a water-activated adhesive on one side is slit into two strips which are separated to the width of the tipping paper, run over a water-applying drum, and laid down on the tipping paper. The apparatus includes a low friction air bearing strip guiding system and a feedback system for controlling strip tension. The water-applying drum has a textured surface to retain sufficient water to activate the adhesive without overwetting the foil strip.

3 Claims, 7 Drawing Figures

APPARATUS FOR PRODUCING A STRIP OF LAMINATED SHEET MATERIAL

BACKGROUND OF THE INVENTION

This invention relates to the formation of a strip of laminated sheet material, and particularly to the formation of cigarette tipping paper having a foil strip laminated to the edge thereof.

In the marketing of cigarettes, it is desirable to increase the physical attractiveness of a cigarette to potential consumers. This can be done in many ways, including the application of a metallic foil band or a printed paper band around the cigarette. One way of applying such a band is to apply it to a completed cigarette. However, this is a relatively expensive and slow process which is impractical given the high production rates of modern cigarette making machines.

Application of the foil or paper band can be accomplished by applying a strip of foil or paper to the tipping paper that overwraps the mouth end of the cigarette. If such a strip is applied to a roll of tipping paper before the tipping paper is loaded into the cigarette maker, then the application of the foil or paper band will have no effect on the rate of cigarette production. However, it then becomes necessary to be able to produce sufficient foil or paper strip-laminated tipping paper to supply the cigarette maker. If the rate at which such laminated tipping paper can be made on a laminating machine is low as compared to the rate at which it is used by a cigarette maker, then a larger number of machines must operate to produce sufficient quantities of the laminated tipping paper.

In fact, because most filter cigarettes are made by placing a double-length filter plug between two tobacco rods and overwrapping that assembly with a double-width piece of tipping paper, it is necessary to produce sufficient quantities of double-width tipping paper having a respective foil or paper strip laminated to each half-width section.

Known laminating machines apply foil or paper strips to the opposite edges of a double-width strip of tipping paper at a rate of approximately 200 feet of tipping paper per minute. It is desirable to increase the rate at which such laminated tipping paper can be produced.

SUMMARY OF THE INVENTION

It is an object of this invention to produce double-width tipping paper having foil strips laminated to laterally spaced-apart positions thereon at a rate of approximately 1,200–1,500 feet per minute.

In accordance with the present invention, there is provided a laminator for applying a first strip of sheet material to a predetermined lateral position on a second strip of sheet material, the first strip having a water-activated adhesive applied to one side thereof. The apparatus includes means for feeding the first strip, means for feeding the second strip, and means for applying sufficient water to the first strip to activate the water-activated adhesive. The water-applying means includes a supply of water, a wick in contact with the water supply, and a drum in contact with the wick and with the adhesive side of the first strip. The drum has a water-retaining textured surface at least in the region where the drum contacts the first strip. The apparatus also includes means for directing the first strip over the textured drum surface to apply water to the adhesive, and means for guiding the first and second strips so that the first strip contacts both the textured drum surface and the predetermined lateral position on the second strip to form a laminated strip. There are also means for drawing the laminated strip and means for maintaining a preselected tension on the first strip between the feeding means and the drawing means.

BRIEF DESCRIPTION OF THE DRAWINGS

The above and other objects and advantages of the invention will be apparent from a consideration of the following detailed description of the invention, taken in conjunction with the accompanying drawings, in which like reference characters refer to like parts throughout, and in which.

DETAILED DESCRIPTION OF THE INVENTION

Figure 1:
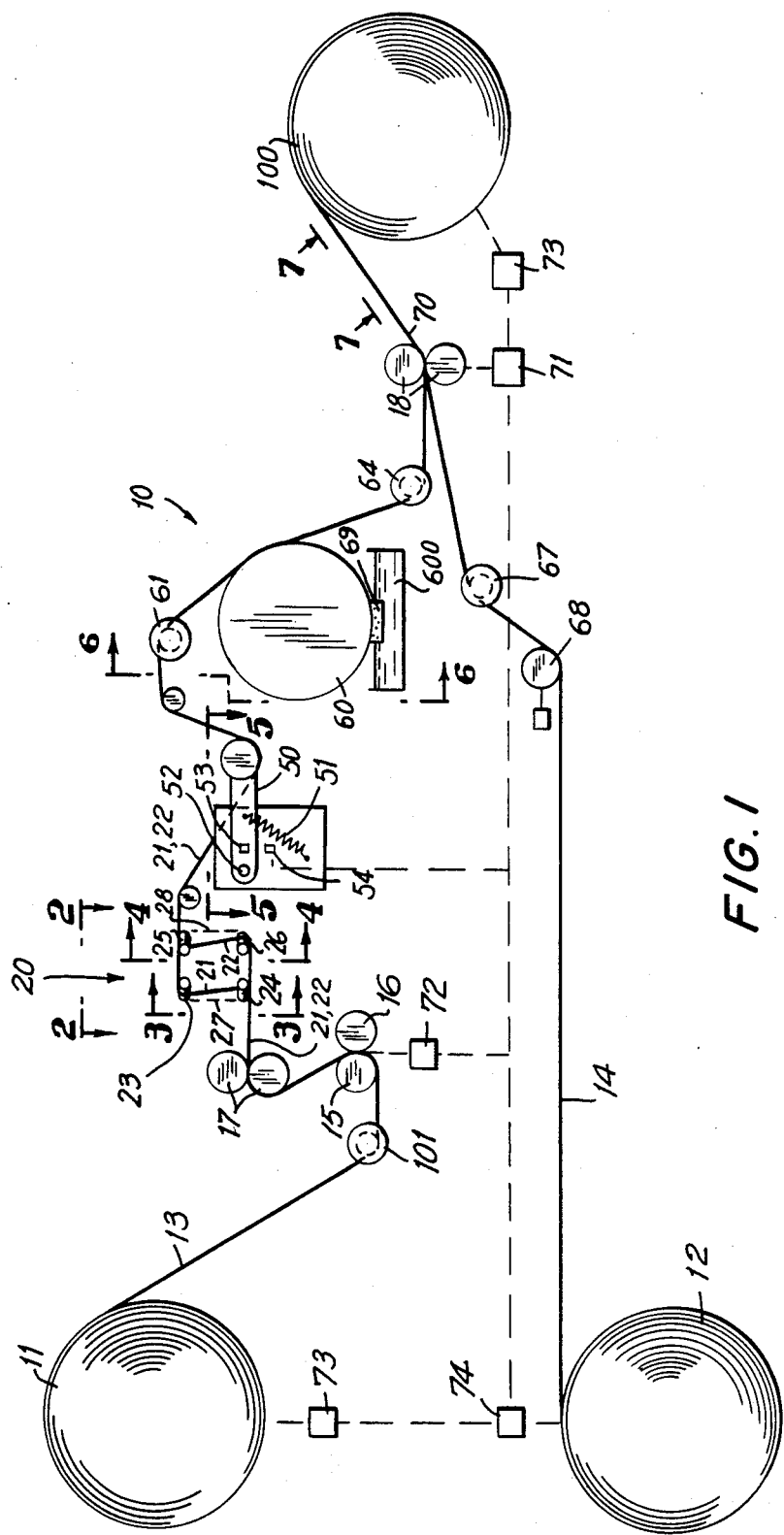
FIG. 1 is a schematic elevational view of the apparatus of the invention.

The apparatus of the present invention can be used to laminate any two strips of material, one of which has a water-activated adhesive on one side. In a preferred embodiment, the apparatus is used to apply a strip of foil to cigarette tipping paper, so that when the tipping paper is applied to a cigarette, the finished cigarette is encircled by a foil band. The preferred embodiment of the apparatus 10 is shown schematically in FIG. 1. The apparatus includes bobbins 11, 12 on which are wound a decorative strip of foil 13 and tipping paper 14, respectively. Foil strip 13 has a water-activated adhesive on the side which faces down in FIG. 1. The side of tipping paper 14 which will face outward on a completed cigarette faces up in FIG. 1. The width of tipping paper 14 is twice the width of the tipping paper in a finished cigarette, and the width of foil strip 13 is equal to the sum of the widths of the foil bands of two cigarettes.

After it is drawn from bobbin 11, double-width foil strip 13 passes between embossing wheels 15, 16 which impress a decorative design onto two longitudinal sections of foil strip 13. Strip 13 then passes through rotary scissors 17 which slits it longitudinally to form two strips 21, 22. Preferably, strips 21, 22 are equal in width, but they can be of unequal width, if desired. As seen on the left in FIG. 2, strips 21, 22 are side-by-side and coplanar as they emerge from scissors 17. They then pass through a lateral separating device 20, the operation of which will be described in more detail below, which moves them apart laterally to approximately their final spacing, while maintaining them in the same plane. Preferably, the final spacing is equal to the width of double-width tipping paper 14, so that strips 21, 22 are laid down on the opposite edges of strip 14. However, other spacings are possible so that strips 21, 22 can be laid down inward of the edges of strip 14, and it is not necessary that both strips 21, 22 be spaced the same distance from the edges of strip 14.

Figure 6:
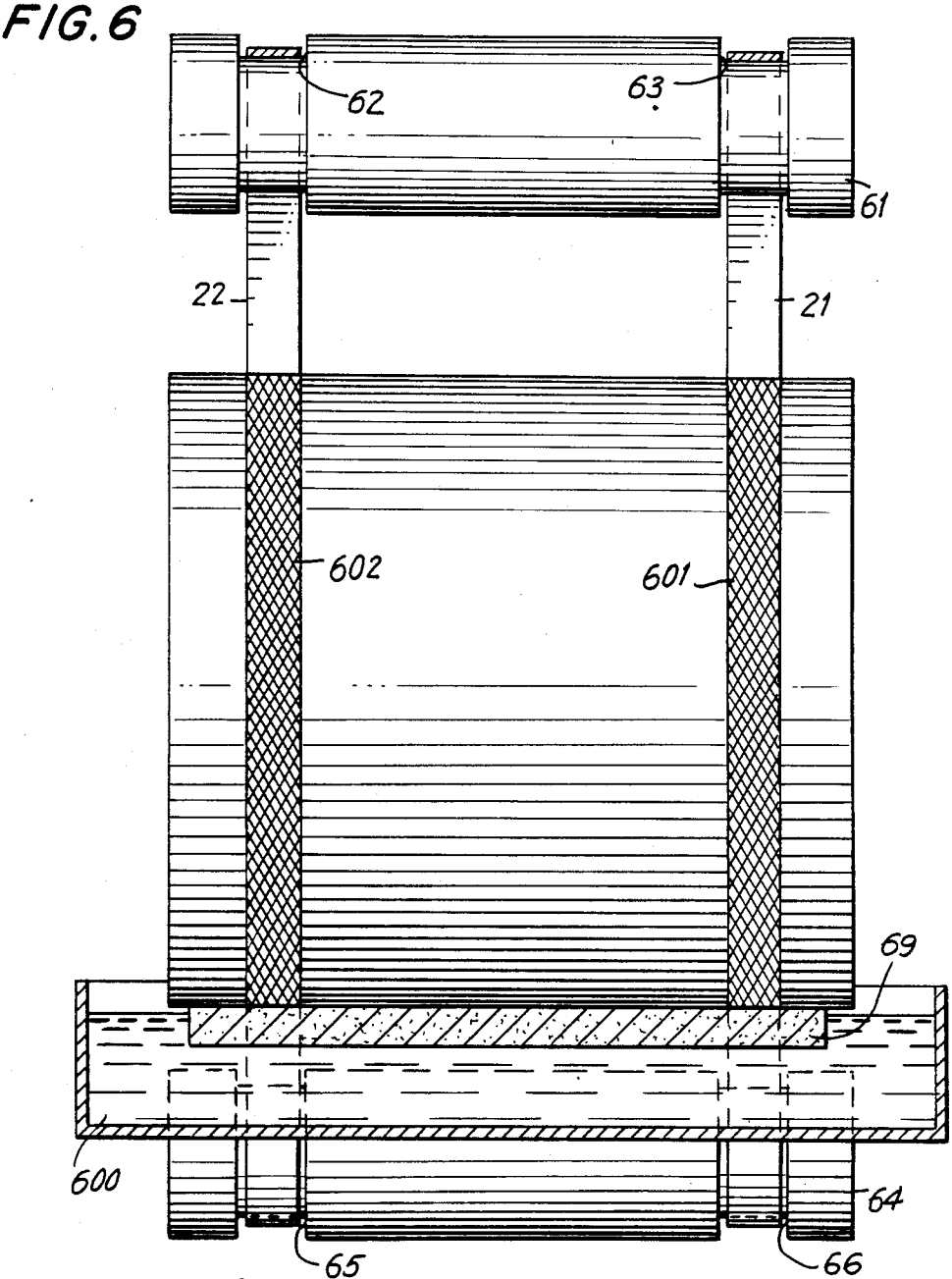
FIG. 6 is an elevational view of the water-applying drum of the invention taken from line 6—6 of FIG. 1.

After they are separated, strips 21, 22 pass under a dancer arm 50 which is part of the mechanism for maintaining a preselected tension on strips 21, 22 as will be described below. Strips 21, 22 are then guided onto water-applying drum 60 by guide post 61. As seen in FIG. 6, guide post 61 has two channels 62, 63 in which strips 21, 22 ride. Channels 62, 63 are spaced so that strips 21, 22 are guided onto the proper locations on drum 60, and are deep enough and wide enough so that strips 21, 22 do not ride up the sides and out of channels 62, 63. A similar guide post 64, having channels 65, 66, guides strips 21, 22, with their adhesive activated by water, from water-applying drum 60 onto the preselected locations on tipping paper strip 14. Strip 14 is also guided to the point at which strips 21, 22 are applied. Tipping guide post 67 is similar to guide posts 61, 64, but has one wide channel to accommodate strip 14, instead of two narrow channels.

Figure 7:
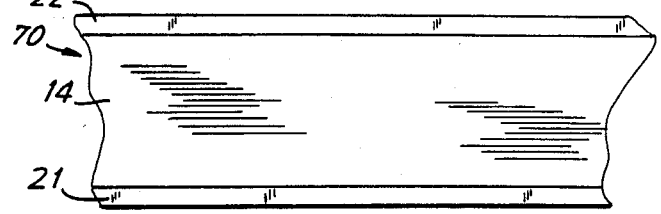
FIG. 7 is a plan view of the finished product of the invention, taken from line 7—7 of FIG. 1.

After strips 21, 22 contact strip 14, the three strips, now forming a single laminated strip 70, pass through clamp rollers 18 to press strips 21, 22 firmly onto strip 14. The finished product, shown in detail in FIG. 7, is then wound onto bobbin 100, which is removed when full for loading into a cigarette maker or tipping machine.

Figure 2:
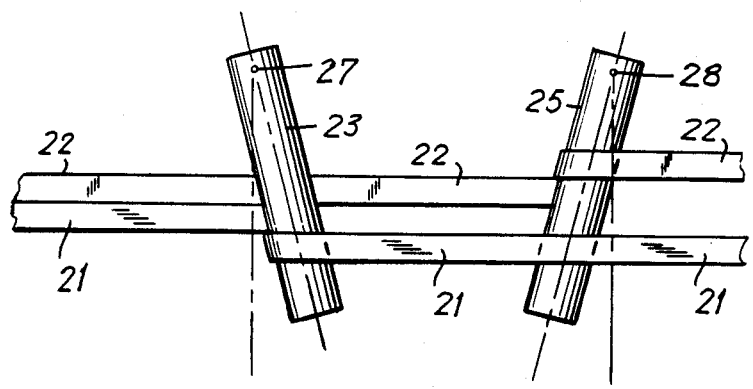
FIG. 2 is a plan view of the lateral separating means of the invention taken from line 2—2 of FIG. 1.
Figure 3:
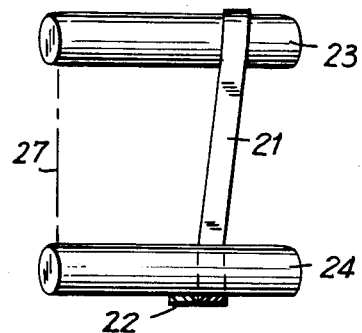
FIG. 3 is an elevational view of a portion of the lateral separating means of the invention, taken from line 3—3 of FIG. 1.
Figure 4:
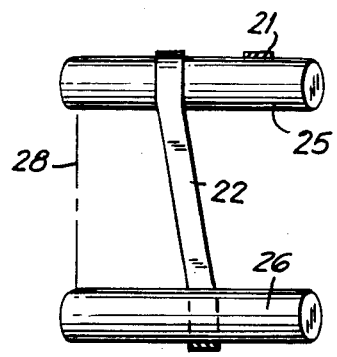
FIG. 4 is an elevational view of another portion of the lateral separating means of the invention, taken from line 4—4 of FIG. 1.
Figure 5:
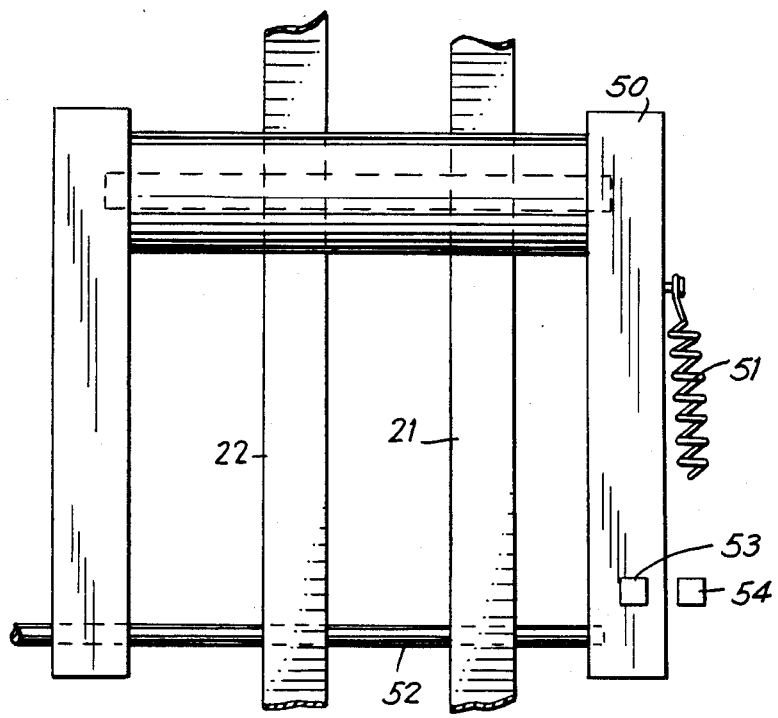
FIG. 5 is a plan view of the dancer arm of the invention, taken from line 5—5 of FIG. 1.

Lateral separating device 20 includes four posts 23-26 having their longitudinal axes parallel to the planes of strips 21, 21 as they enter and leave device 20. Posts 23, 24 are pivotable at one end about axis 27, which is perpendicular to those planes. Similarly, posts 25, 26 are pivotable at one end about axis 28, parallel to axis 27. The operation of device 20 is best seen in FIGS. 2-4. Strip 21 passes under and around post 24 and then around and over post 23. Strip 22 passes under and around post 26 and then around and over post 25. If the longitudinal axes of posts 23, 24 or posts 25, 26 are perpendicular to the direction of travel of strip 21 or 22, there is no lateral deflection of the strip. If the longitudinal axes of both posts in each pair of posts 23, 24 or 25, 26 are pivoted the same amount, then the strip 21 or 22 leaves device 20 parallel to the direction in which it entered, but shifted laterally toward the forwardmost post end. If the pivot axis is on the left and the post longitudinal axes are pivoted in the direction of strip travel, as are posts 23, 24, so that the rightmost ends of the posts are forwardmost, then the strip is shifted to the right, as is strip 21 in FIG. 3, where posts 23, 24 are pivoted into the plane of the figure. If the pivot axis is on the left and the post longitudinal axes are pivoted against the direction of strip travel, as are posts 25, 26, so that the leftmost ends of the posts are forwardmost, then the strip is shifted to the left, as is strip 22 in FIG. 4, where posts 25, 26 are pivoted out of the plane of the figure. If the pivot axis were on the right (not shown), then pivoting the posts in the direction of strip travel would shift the strip to the left, and pivoting the posts against the direction of strip travel would shift the strip to the right.

Water-applying drum 60 is kept wet by contact with wick 69, which in turn is in contact with water supply 600. It is desired to wet strips 21, 22 sufficiently to activate the adhesive, but not so much as to saturate the strips. Wick 69 is used to wet drum 60 because it has been found that if drum 60 is in direct contact with water supply 600, the rotation of drum 60 throws up too much water into the region around drum 60, overwetting strips 21, 22. Drum 60 has a textured surface on those portions 601, 602 of its periphery that contact strips 21, 22. The textured surface has a diamond-like pattern designed to retain a sufficient amount of water to activate the adhesive but not so much water as to overwet strips 21, 22. It is to be understood that the entire drum surface can be textured if desired, particularly if one wanted to be able to vary the strip separation without having to change drums.

In order for strips 21, 22 to be laid down properly on strip 14, the tension on the strips must be carefully controlled. Apparatus 10 incorporates a feedback mechanism to control the tension on strips 14, 21, 22. In order to control the tension in strips 21, 22, a tachometer 71 associated with clamp rollers 18 measures the draw rate of laminated strip 70 which is being drawn by bobbin 100. A motor and tachometer 72 associated with embossing wheels 15, 16 draws strip 13 from bobbin 11 and measures the feed rate of strip 13. Tachometers 71, 72 send signals to control units 73 which are associated with feed and take-up bobbins 11, 100, and which control the draw rates of strips 13, 70.

Because tachometers 71, 72 cannot react fast enough to accurately control the tension in strips 21, 22, dancer arm 50 is provided as an additional tension control sensor. Dancer arm 50 is biased by spring 51 to maintain dancer arm 50 at a predetermined attitude, e.g., horizontal, when the tension on strips 21, 22 is correct. Dancer arm 50 pivots about point 52 and has a permanent magnet 53 mounted thereon. Adjacent permanent magnet 53, but not attached to dancer arm 50, is a stationary Hall effect sensor 54. Sensor 54 generates a voltage indicative of the position of magnet 53 based on the Hall effect, by which a current-carrying conductor in a magnetic field develops a potential difference transverse to the direction of current flow, the amplitude of the potential difference depending on the strength and direction of the magnetic field. The signal from sensor 54 is therefore indicative of the angular position of dancer arm 50. This signal is also sent to control units 73 and is used to vary the draw rate of strip 13 to maintain dancer arm 50 at its predetermined attitude.

The outputs of tachometer 71 and a strain gauge-type tension sensor 68 which monitor the tension on strip 14 are fed to a control unit 74 which controls the drag on tipping bobbin 12 to maintain a constant tension on strip 14.

Apparatus 10 also includes a low friction web guiding system in which bearing films of air are used around certain of the posts around which strips 13, 14, 21, 22 pass, including posts 23, 24, 25, 26, 61, 64, 67, 101. These posts are made from sintered metal which has a porous structure. Air under pressure is applied to the centers of the posts and it emerges at the surface of the posts to provide a bearing film of air. It is to be understood that solid metal can be used, and provided with holes bored in its surface connecting to a central bore to which air is supplied under pressure. If a post has a channel in which the strip is guided, such as posts 61, 64, 67, it is sufficient for the bearing film of air to be provided in the channel, whether sintered metal or solid metal with bores is used.

One skilled in the art will recognize that the inventive principles disclosed herein can be practiced by other than the embodiments described above, which are presented for the purposes of illustration and not of limitation, and the present invention is limited only by the claims which follow.

What is claimed is:

1. A laminator for applying first and second strips of foil to laterally spaced-apart positions on a strip of double-width cigarette tipping paper to form a laminated strip of tipping paper, each of said foil strips having a respective width and having a water-activated adhesive applied to one side thereof, said laminator comprising:

means for feeding a precursor strip of foil having a width equal to the sum of the respective widths of said first and second strips of foil, said feeding means including a bobbin on which said precursor strip is wound and means for controlling the rate at which said precursor strip is unwound from said bobbin;

means for feeding said strip of double width tipping paper, said feeding means including a bobbin on which said strip of tipping paper is wound;

a pair of embossing wheels for embossing said precursor strip, said embossing wheels having a first tachometer associated therewith providing a feed rate signal;

a rotary scissors for slitting said embossed precursor strip to form said first and second strips;

means for laterally separating said first and second strips after slitting, said separating means comprising a respective pair of spaced-apart parallel separating posts associated with each of said first and second strips, the longitudinal axes of said separating posts being parallel to the plane of said first and second strips, each separating post being pivotable at one end thereof about an axis perpendicular to said plane, the separating posts in each pair of separating posts remaining parallel to one another, such that said first and second strips are shifted laterally as they pass around said separating posts, the degree of lateral shifting being determined by the angular displacement of the longitudinal axes of the separating posts from a direction perpendicular to the direction of travel of said first and second strips, said separating posts comprising a porous material and having bearing films of air therearound provided by blowing air under pressure from the centers of said separating posts, wherein the angular displacement of each of said pairs of separating posts is selected such that the total relative lateral shift of said first and second strips equals the width of said strip of tipping paper;

means for applying sufficient water to said first and second strips to activate said water-activated adhesive, said water-applying means comprising:
a reservoir of water,
a wick in contact with said reservoir, and
a drum having a periphery in contact with said wick and with said one side of each of said first and second strips, said drum having a smooth surface over most of the periphery thereof and having a water-retaining textured surface over those portions of said periphery in contact with said first and second strips;

a directing post adjacent said drums for directing said first and second strips over said textured surfaces of said drum, said directing post having a respective channel in the surface thereof for directing each of said first and second strips, each said channel having a width no less than the width of its respective strip, said directing post further comprising a porous sintered metal, a bearing film of air being provided therearound at least in the regions of said channels by blowing air under pressure from the interior of said directing post through said porous sintered metal;

a foil guiding post for guiding said first and second strips to the respective edges of said tipping paper after activation of said adhesive, said foil guiding post having a respective channel in the surface thereof for guiding each of said first and second strips, each said channel having a width no less than the width of its respective strip, said foil guiding post further comprising a porous sintered metal, a bearing film of air being provided therearound at least in the regions of said channels by blowing air under pressure from the interior of said foil guiding post through said porous sintered metal;

a tipping guiding post for guiding said strip of tipping paper adjacent the point of contact with said first and second strips, said tipping guiding post having a channel in the surface thereof for guiding said tipping strip, said channel having a width no less than the width of said tipping strip, said tipping guiding post further comprising a porous sintered metal, a bearing film of air being provided therearound at least in the region of said channel by blowing air under pressure from the interior of said tipping guiding post through said porous sintered metal;

a pair of clamp rollers for clamping said first and second strips and said tipping strip to form said laminated strip, said clamp rollers having a second tachometer associated therewith providing a drawing rate signal;

means for drawing said laminated strip, said drawing means comprising a bobbin on which said laminated strip is wound and means for driving said bobbin; and means for maintaining a preselected tension on said first and second strips between said feeding means and said drawing means, said tension maintaining means comprising:
means for comparing said feed rate signal and said drawing rate signal,
a dancer roller intermediate said separating means and said directing post around which said first and second strips run, said dancer roller being biased on an arm about a pivot point by a spring chosen to achieve said preselected tension,
a permanent magnet mounted on said arm,
a stationary Hall effect sensor mounted adjacent said permanent magnet to indicate the angular position of said arm about said pivot point, and
means for adjusting at least one of said feed rate and said drawing rate based on said comparison of said rates and on said angular position.

2. The laminator of claim 1 wherein said respective widths of said first and second strips of foil are equal.

3. The laminator of claim 1 where said spaced-apart lateral positions are at either edge of said strip of double-width tipping paper.

* * * * *